United States Patent
Garlick

[15] 3,673,688
[45] July 4, 1972

[54] GEOLOGICAL MECHANICAL COMPUTER

[72] Inventor: George F. Garlick, Richland, Wash.
[73] Assignee: Holosonics, Inc., Richland, Wash.
[22] Filed: Feb. 11, 1970
[21] Appl. No.: 10,359

[52] U.S. Cl. .................................................................. 33/1
[51] Int. Cl. ..................... G06g 1/08, G06g 3/10, E21b 47/00
[58] Field of Search .................................... 33/1 SD, 1 SA

[56] References Cited

UNITED STATES PATENTS

| 1,895,606 | 1/1933 | Burns | 33/1 SA |
| 2,563,840 | 8/1951 | Hundhausen | 33/1 SA |
| 3,012,324 | 12/1961 | Swift | 33/1 E |

OTHER PUBLICATIONS

Auslegeschrift 1,103,262 3- 1961 Germany Petrowitsch

*Primary Examiner*—Robert B. Hull
*Attorney*—Wells, St. John & Roberts

[57] ABSTRACT

A geological mechanical computer is disclosed for displaying an analog of a stratum intersected by a borehole and determining the true dip and strike of the stratum from input information of the bearing and angle of inclination of the borehole and the structure angle and angle of orientation of the stratum with respect to the borehole. The computer has a stratum plane assembly mounted on a base for rotational movement about a vertical axis and pivotal movement about a horizontal axis. A shaft representing the borehole is operatively connected to a disc of the stratum plane assembly through a structure angle mechanism in which the shaft has a rotational axis that intersects the vertical axis and horizontal axis at a fixed intersection. A ring is rotatably mounted to the disc for rotation about the fixed reference in the plane of the stratum plane assembly. The ring has shaft elements extending therefrom having an axis coincident to the horizontal axis. A true dip pointer is radially affixed to one of the shaft elements for rotation about the shaft element. A protractor is freely suspended on the shaft element adjacent the pointer to visually display the true dip of the stratum plane assembly.

8 Claims, 5 Drawing Figures

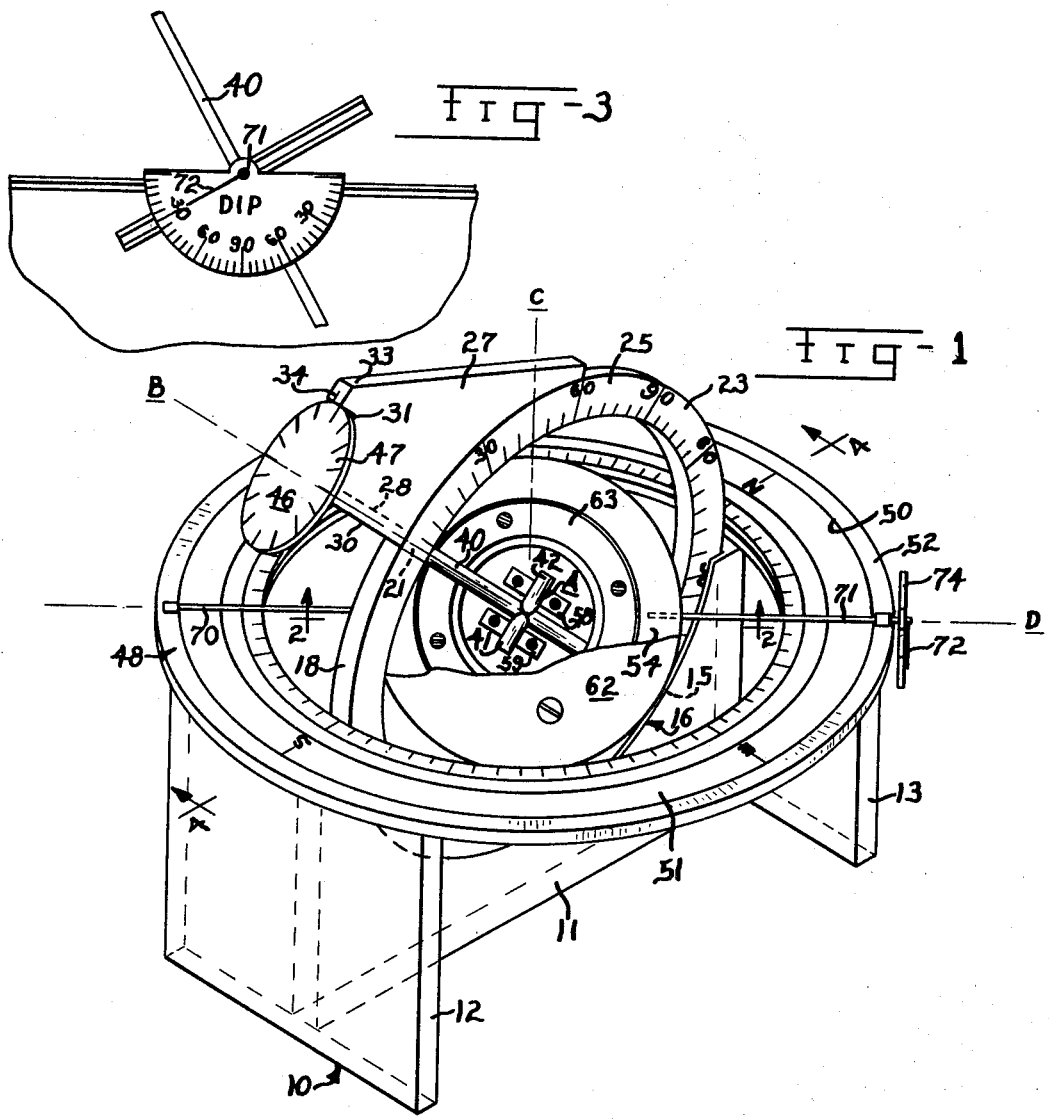
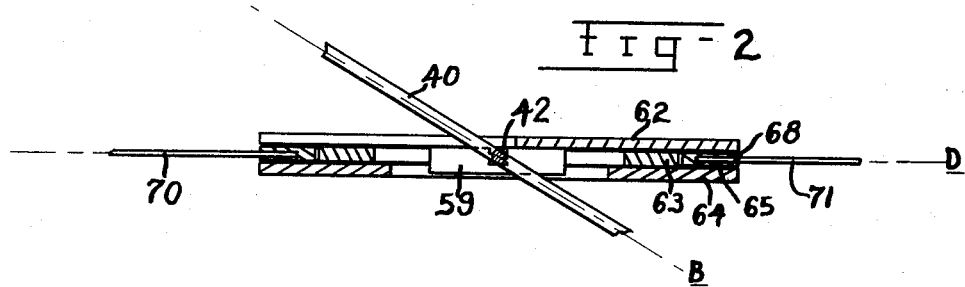
INVENTOR.
George F. Garlick
BY
Wells, St John & Roberts
Attys

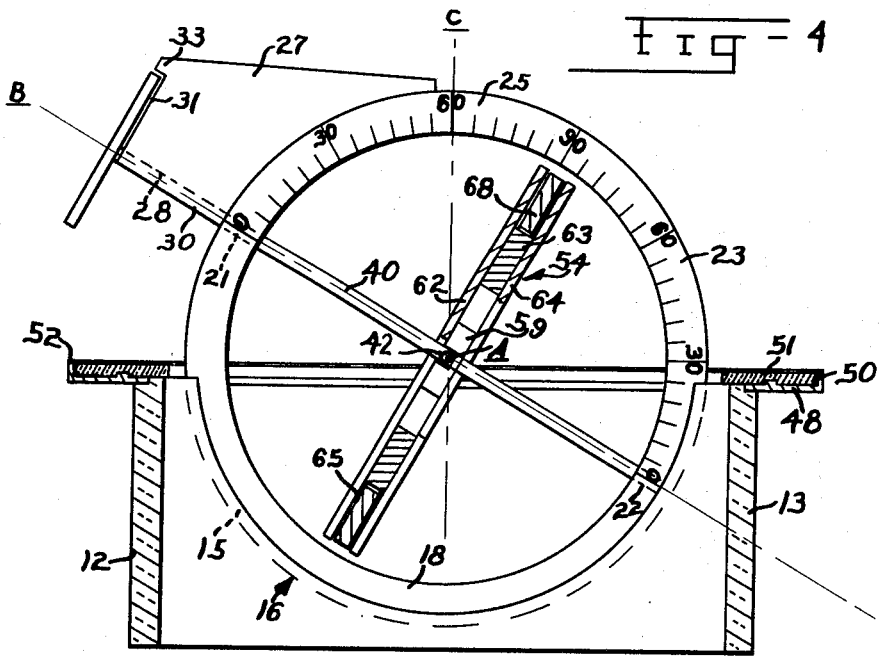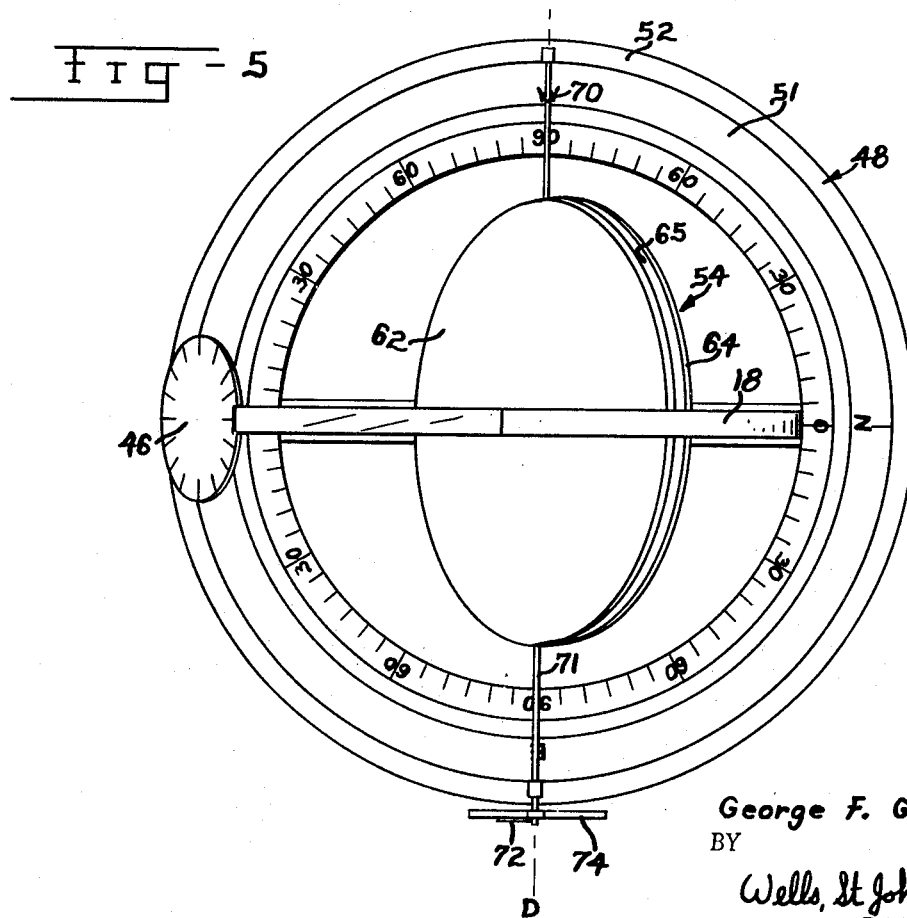

GEOLOGICAL MECHANICAL COMPUTER

BACKGROUND OF THE INVENTION

This invention relates to mechanically determining the true dip and strike of a stratum encountered by a borehole and to provide a physical analog representing the positions and relationships of the borehole and the stratum.

Frequently, in the geological exploration of underground formations, it is desirable to determine the direction and dip of a particular stratum encountered by an exploration drill or borehole to facilitate further exploration; and to assist in the prediction of the existence and extent of oil or mineral deposits.

The directional nature of the stratum is generally defined in terms of true dip and strike. The true dip of a stratum is generally defined as the vertical angle of the stratum with respect to a horizontal plane passing through the intersection of the borehole and stratum. The direction of dip of the stratum is generally defined as the horizontal angle between the dip line projected on said horizontal plane and north. The true strike is generally defined as the horizontal angle between north and a line formed by the intersection of the stratum and a horizontal plane passing through the intersection of the borehole and stratum.

Through information obtained from the core samples taken from the borehole at the location where the stratum is encountered, geologists are able to determine the angle at which the stratum intersects the borehole. Frequently, although it is generally more expensive, the direction in which the stratum slopes away from the borehole can be obtained by angularly relating the core sample to the borehole. The smallest angle between stratum and the borehole axis is defined as the structure angle. The direction of the slope of the stratum with respect to the borehole is frequently stated in terms of the angle between a reference vertical plane containing the borehole axis and the direction of the slope of the stratum with respect to the borehole. This angle is referred to as the angle of orientation.

With this information, in addition to the bearing and angle of inclination of the borehole, the geologist is able to build a mathematical and physical model of the orientation of stratum. Frequently, the geologist resorts to presenting the stratum in two-dimensional perspective views in an attempt to display the orientation of the stratum.

Besides being quite tedious and expensive, the final product is not totally satisfactory because it is difficult to visually display a three-dimensional object in two dimensional terms. Consequently, three-dimensional models are often constructed adding to the cost of the project.

For many years, geologists and closely allied scientific personnel have endeavored to construct a mechanical computer capable of presenting an analog of the stratum and at the same time mechanically determine and display the true dip and strike of the stratum without having to solve the problem mathematically and then build or construct an analog or model of the stratum to display its orientation.

Many attempts have been made in this direction; however, most of such geological mathematical computers are quite complicated and visually unsatisfactory. Furthermore, some of such devices utilize other input information.

Examples of such prior art are disclosed in U.S. Pat. Nos. 1,792,639; 2,149,716; 2,357,617; 2,496,422; 2,615,248; and 3,305,929.

One of the principal objects of this invention is to provide a geological mechanical computer that is quite simple to construct having exceptional display qualities.

An additional object of this invention is to provide a geological mechanical computer that is capable of presenting an analog of the stratum and accurately displaying the true dip and either the angle of orientation of the stratum with respect to the borehole or the strike of the stratum from input information of the bearing of the borehole and the structure angle of the stratum with respect to the borehole and either the angle of strike or orientation respectively.

A further object of this invention is to provide such a mechanical computer in which the same structural element presents both the true dip and the strike.

An additional object of this invention is to provide a planar analog of the stratum having an element that is pivotable within the planar analog and maintained in a horizontal dip reference plane.

These and other objects and advantages of this invention will be more readily appreciated upon the reading of the following detailed description of a preferred embodiment.

BRIEF DESCRIPTION OF THE DRAWINGS

A preferred embodiment of this invention is illustrated in the accompanying drawings; in which:

FIG. 1 is a perspective view of a geological mechanical computer incorporating the principal features of this invention;

FIG. 2 is a fragmentary vertical cross sectional view taken along line 2—2 in FIG. 1;

FIG. 3 is a fragmentary side view of a section of the computer illustrating a dip indicator;

FIG. 4 is a vertical cross sectional view taken along line 4—4 in FIG. 1; and

FIG. 5 is a plan view of the computer.

DETAILED DESCRIPTION OF A PREFERRED EMBODIMENT

A geological mechanical computer is illustrated in FIG. 1 having a base 10 with a center cradle 11 and end walls 12 and 13. The cradle 11 has an annular groove 15 formed in the upper surface forming a track 16. The groove 15 extends in an arc of approximately 180°.

A vertical angular ring 18 is slidably mounted on the cradle 11 in the groove 15 for rotation in a vertical plane about a center ring axis intersecting a reference point A. Holes 21 and 22 are formed radially through the ring 18 in diametrically opposite locations. A 90° angle of inclination scale 23 is formed on the ring 18 with a 0° mark aligned with the hole 22 and extending a quarter of the way around the ring to a 90° mark. A 90° structure angle scale 25 is also formed on the ring 18 having a 0° mark aligned with the hole 21 and extending a quarter of the way around the ring 18 to the 90° mark of the angle of inclination scale.

An arcuate handle projection 27 is affixed to the ring 18 projecting outward with a radial bearing recess 28 formed in a lower surface 30 aligned with the holes 21 and 22. A dial recess 31 is formed in the handle projection perpendicular to the bearing recess 28. A pointer abutment 33 is formed on the handle projector 27 associated with the dial recess 31 to form part of an angle of orientation indicator. A pointer arrow or hairline 34 is formed on the abutment 33 in the vertical plane of the ring 18.

An elongated shaft 40, representing the borehole, is rotatably mounted on the ring 18 for rotation about its center shaft axis B that intersects the reference point A. The shaft 40 is supported in the holes 21 and 22 for movement with the ring 18 to position the shaft 40 at an angle with respect to a fixed horizontal plane on said base corresponding to the angle of inclination of the borehole. One end of the shaft 40 extends radially outward from the ring 18 residing in the bearing recess 28. An angle of orientation dial 46 is affixed on the outer end perpendicularly to the axis of the shaft for rotational movement in the dial recess 31. A 360° scale 47 is formed on the dial for association with the pointer arrow 34 for indicating the angular position of the shaft 40 about the shaft axis with respect to the vertical plane containing the shaft axis in terms of an angle of orientation. Stud shafts 41 and 42 are affixed to the shaft 40 along a transverse axis that extends through the reference point A normal to the shaft axis B.

An equator ring 48 is horizontally affixed on the base 10 coaxially about a vertical axis C that intersects the reference point A. The ring has a circular recess 50 (FIG. 4) formed therein for slidably receiving an equator scale or compass rose 51. The equator scale 51 may be rotated in the recess. The equator ring 48 also has an angular horizontal bearing surface 52 formed on base 10 outside the annular recess 50.

A stratum plane assembly or simulator 54 is mounted on the base for rotation about the vertical axis C with radical shaft elements 70 and 71 relative to equator ring 48 and for pivotal movement about a horizontal disc axis D that lies in the plane of the assembly 54 and intersects the reference point A. The assembly 54 is also pivotally mounted on the shaft 40 for pivotal movement about the axis of the transverse stud shafts 41 and 42. The stratum plane assembly 54 includes a face disc 62 that is secured to the stud shafts 41 and 42 for rotation with the shaft 40 and for pivotal movement about the transverse axis. Friction bearing elements 58 and 59 secure the face disc 62 to the stud shafts 41, 42 to frictionally hold the disc 62 at nearly any desired pivoted orientation about the stud shafts 41 and 42. By selectively fixing the angular position of the reference plane defined by disc or ring 68 described below relative to shaft axis B within a plane containing the shaft axis B and perpendicular to the reference plane (by pivoting disc 62 about shafts 41, 42) one can thereby represent the structural angle of the stratum.

A bearing ring 63 having a smaller diameter than the disc 62 is affixed coaxially on the back of the disc 62. A rear plate 64 is secured to the bearing ring 63 extending outward beyond the periphery of the bearing ring 63 to form a circular groove 65 about the periphery of the bearing ring 63.

A centrally apertured disc or ring 68 is slidably mounted in the groove on the periphery of the ring 63 to permit the face disc 62, bearing ring 63 and back plate 64 to rotate with respect to the disc 68 about the central or polar axis of the latter, which intersects point A while maintaining the disc 68 in the same plane as the bearing ring 62. The disc 68 has radial shaft elements 70 and 71 lying in the aforesaid reference plane defined by disc 68 and fixed thereto, aligned with the horizontal disc axis D and extending radially outward with the ends thereof slidably supported on the annular abutment surface 52. The outer end of the shaft element 71 extends outward beyond the equator ring 50.

The shaft elements, 70, 71 engaging the surface 52, prevent the disc 68 from rotating about any horizontal axis but their own but permit the disc 68 to rotate about the vertical axis C and to pivot about the horizontal axis D. Shaft elements 70, 71 maintain the disc axis D within a fixed horizontal plane on base 10 with the disc axis D intersecting reference point A.

As part of a dip indicator, a pointer 72 is affixed indirectly to disc 68 on the outer end of the shaft element 71 radially extending from the shaft lying in the plane of the disc 68. A protractor 74 is freely hung on the outer end of the shaft element 71 in a suspended manner to provide a reference for the pointer with respect to the horizontal to read the true dip directly from the protractor. The protractor 74 is gravity biased to maintain the same orientation relative to the horizontal independently of the position of the disc 68.

The shaft elements 70 and 71 also serve as a strike indicator in conjunction with the equator scale 51 to enable a direct reading to be made of the strike of the simulated stratum.

To operate the computer, the ring 18 is rotated to position the shaft 40 at an angle of scale 23 corresponding to the angle of inclination of the borehole. For example, if the angle of inclination is 30°, then the ring would be rotated until 30° on the scale is located in the horizontal plane of the equator scale 50. Shaft 40 is rotated about its axis to position the stud shafts 41, 42 transverse to ring 18 by setting scale 47 to zero at pointer 34. The stratum plane 54 assembly is then pivoted manually about the stud shafts 41, 42 to an angle on scale 25 corresponding to the structure angle of the stratum with respect to the borehole. For example, if the structure angle was 45°, then the stratum plane assembly 54 is pivoted about the stud shafts 41, 42 when the shafts 41, 42 transverse to ring 18 until the periphery of the assembly 54 is opposite the 45° mark on scale 25. The equator scale 51 is rotated on the equator ring to position the scale to show the borehole bearing at the vertical plane of the ring 18. For example, if the bearing is 22° east of north, then the equator scale is rotated until the 22° east of north mark is aligned with the vertical ring 18 on the side of the equator scale opposite to the handle projection 27. The dial 46 is then rotated about the axis of shaft 40 to position a mark corresponding to the angle of orientation opposite the pointer arrow 34. If the angle of orientation is 270° then the dial 46 and shaft 40 are rotated about the axis of shaft 40 to locate the mark 270° of the dial opposite the pointer arrow 34. As the shaft 40 is rotated, the face disc 62 is driven thereby to rotate with respect to the disc 68 and automatically at the same time drivingly to pivot the disc 68 about the horizontal axis D represented by the shaft elements 70 and 71 and rotate the disc 68 about the vertical axis C. When the dial is rotated to the angle corresponding to the angle of orientation, then the true dip can be read directly from the dip protractor 74 and the strike can be read directly from the equator scale 51 at the locations where the shaft elements project over the face of the scale.

One can readily see that if any two of the four defined angles (strike, dip, orientation and structure) are known they may be appropriately set on the computer and the remaining two angles directly read. Also the stratum plane assembly, particularly the face disc 62, is presented as an analog of the stratum which is easily visible and can be easily understood.

For some applications, such as mineral exploration from existing mining shafts and tunnels, the boreholes are normally drilled at an angle of inclination of 0°. For such purposes it may be desirable to eliminate the ring 18 and mount the shaft 40 horizontally. In this case, a protractor may be mounted between the stratum plane assembly and the shaft to be able to set the stratum plane assembly at the desired structure angle with respect to the shaft.

It should be readily appreciated that numerous other embodiments of this invention may be readily devised incorporating the principles of this invention. Therefore only the following claims are intended to define this invention.

What is claimed is:

1. A geological mechanical computer for determining the true dip of a stratum intersected by a borehole in which the bearing and angle of inclination of the borehole and the structure angle and angle of orientation of the stratum with respect to the borehole are known, said mechanical computer comprising:

a base;

a disc representing the stratum, and means mounting said disc mounted for rotational movement about a fixed vertical axis of the base and pivotal movement about a horizontal axis fixed in the plane of the disc and intersecting the vertical axis at a reference point fixed relative to the base;

a shaft representing the borehole, and means maintaining the longitudinal axis of said shaft in a vertical plane containing said vertical axis, and said longitudinal axis intersecting said reference point, simulating the intersection of the stratum and the borehole;

said last named means being mounted on the base and supporting the shaft for rotation of the shaft relative to said base about the shaft axis and for angularly adjustably supporting the shaft relative to the base at a vertical angle about the reference point corresponding to the angle of inclination of the borehole;

means drivingly interconnecting the shaft and the disc for relative rotation of the disc about its polar axis and maintaining the disc at an angle with respect to the shaft axis corresponding to the structure angle whereby pivoting and rotation of the disc about said horizontal and vertical axes respectively automatically takes place simultaneously with the rotation of the shaft about said shaft axis to present the disc as an analog of the stratum when the shaft is rotated about its axis to an angle relative to said vertical plane corresponding to the angle of orientation; and indicator means mounted to the disc for indicating the angular position of the disc about said horizontal axis relative to a horizontal plane containing said reference point when said shaft is rotated about the shaft axis to the angle relative to said vertical plane corresponding to the angle of orientation to automatically present the true dip of the stratum.

2. A geological mechanical computer as defined in claim 1 wherein the disc has a shaft element extending outward along the horizontal pivot axis and wherein the indicator means includes a pointer mounted on the end of the shaft element and extending radially therefrom in the plane of the disc indicating the true dip of the disc.

3. A geological mechanical computer as defined in claim 2 wherein the indicator means further includes an angular scale mounted on the end of the shaft element and freely suspended therefrom adjacent the pointer to provide a visual read out of the true dip of the stratum.

4. A geological mechanical computer as defined in claim 2 further comprising an equator scale rotatably mounted on the base coaxially about the vertical axis and associated with the shaft element to depict the true strike of the stratum when the disc is an analog of the stratum and the equator scale reflects the bearing of the shaft element.

5. A geological mechanical computer as defined in claim 1 wherein the interconnecting means between the shaft and disc includes:
 a bearing ring rotatably mounted to and coaxial with the disc;
 means securing the bearing ring to the shaft at the angle corresponding to the structure angle for pivoting the disc about the horizontal axis and rotating the disc about the vertical axis when the shaft is rotated.

6. A geological computer, comprising:
 a base;
 said base having a horizontal annular surface formed thereon;
 an annular ring mounted on the base for rotation relative thereto about a fixed horizontal ring axis of the base;
 a shaft representing a borehole and having a center shaft axis along its length;
 said shaft being mounted on said ring for rotation of the shaft about its shaft axis relative to the ring, said shaft axis being located on said ring in a vertical plane with the shaft axis intersecting said fixed horizontal ring axis, such intersection constituting a fixed reference point on the base;
 a disc containing a reference plane representing the stratum and having a disc axis lying within said reference plane;
 means interconnecting the disc to the shaft for relative rotation about the polar axis of the disc with the reference plane thereof and said polar axis intersecting the shaft at said reference point, such intersection representing the intersection of a borehole with a stratum, and for selectively fixing the angular position of the reference plane relative to the shaft axis within a plane containing the shaft axis and perpendicular to the reference plane to represent the structural angle of the stratum relative to the borehole;
 means mounted on the disc engaging said horizontal annular surface for maintaining the disc axis within a fixed horizontal plane relative to said base with the disc axis intersecting said fixed reference point;
 first angular indicator means on said base and said ring for indicating the angular position of said ring about said ring axis with respect to said fixed horizontal plane to represent the angle of inclination of the borehole;
 second angular indicator means on said ring and said shaft for indicating the angular position of said shaft about said shaft axis with respect to said vertical plane to represent the angle of orientation of the stratum;
 and third angular indicator means on said disc for indicating the angular position of the reference plane about said disc axis with respect to the horizontal plane to represent the true dip of the stratum.

7. A geological computer as set out in claim 6 wherein the disc has a shaft element extending coaxially along the disc axis and rotatable with the disc about the disc axis, said third angular indicator means including a pointer mounted on the shaft element and extending radially therefrom with respect to the disc axis for pivotal movement about the disc axis in response to rotation of the shaft element.

8. A geological computer as set out in claim 6 wherein said means mounted on the disc engaging said horizontal annular surface comprises a shaft element extending from the disc and being in surface contact with the horizontal annular surface of the base.

* * * * *